United States Patent Office 3,382,087
Patented May 7, 1968

3,382,087
SILVER AND COPPER COATED ARTICLES PROTECTED BY TREATMENT WITH AMINOAZOLE COMPOUNDS
John S. Ostrowski, Pittsburgh, Pa., assignor to Pittsburgh Plate Glass Company, Pittsburgh, Pa., a corporation of Pennsylvania
No Drawing. Filed Aug. 20, 1964, Ser. No. 391,023
22 Claims. (Cl. 117—35)

ABSTRACT OF THE DISCLOSURE

Articles, such as mirrors and windows, having thereon a thin silver and/or copper film are protected from discoloration and deterioration due to corrosion by treatment of the film with an aminotriazole, an aminotetrazole, an aminoindazole, or an indazole. The treatment can be carried out by contacting the metallic film or an organic coating superimposed on the metallic film with the substituted azole, preferably in solution. Alternatively, the substituted azole can be included in the superimposed organic coating, if any. Such treatment retards and prevents for long periods of time the deterioration and attack of the metallic film which is ordinarily evidenced by discoloration and/or removal of the metallic film.

This invention relates to the protection of articles comprising a thin metallic film, and more particularly, to the protection of copper and silver films by treatment with a substituted azole.

A number of articles in widespread use comprise a thin metallic film or layer of silver or copper. Among the common articles on which such thin metallic films are employed are those of glass, such as mirrors, windows, and the like. In such articles, the films are of varying thickness; for example, mirrors may have a metallic layer of 3 to 10 microinches in total thickness, while the transparent metallic film on windows and the like, wherein the film serves as a solar shield, is typically 4 to $20 \times 10^{-8}$ inches thick.

Since these articles are intended for use over extended periods, the durability of the metallic film is an important consideration. These films, although varying in thickness, are always quite thin, and such thin films are subject to degradation due to oxidation and heat, and to attack by chlorides, sulfides, and other air contaminants to a greater degree than thicker films, or at least the deterioration and attack are more easily noticed at lower levels. Presumably because of the thinness of the film, even materials that are known to inhibit the corrosion and tarnishing of the metal are not sufficiently effective to prevent the degradation of such articles, and in some cases, such known "inhibitors" actually increase the rate of degradation of the film.

Because the visual properties of these articles are in most cases important, such deterioration and attack, even if slight, is highly undesirable as it is inevitably evidenced by discoloration and/or removal of the metallic film. For this reason, the exposed metallic surface of mirrors is usually coated with an organic coating composition which forms a protective layer. However, even this is not sufficient to prevent eventual attack and discoloration, apparently because such organic layers are sufficiently permeable to permit transfer of the chlorides, sulfides, and the like to the metallic film. Also, in some instances reactive groups in the organic layer react with the metal and discolor the mirror, particularly when the metal surface is silver. Furthermore, when the coating is to be used in a window or the like, the use of an organic coating is not feasible.

It has now been found that treatment of thin metallic films of silver and copper with an aminotriazole, an aminotetrazole, an aminoindazole, or an indazole provides a remarkable degree of protection to these films, such that their degradation as described above is retarded and even prevented for long periods of time. The treatment need only consist of contacting the film with the substituted azole. Where an organic film is superimposed on the metallic film, sufficient treatment is achieved by contacting the organic film with the azole. The mechanism by which the treatment protects the metallic film is not known; both physical and chemical actions are possible. A visible layer of the azole is not necessary, and in the preferred contacting method, the surface is washed after application of a very dilute solution of the azole. Nevertheless, as described below, a high order of protection is achieved.

The thin films which are treated in accordance with this invention are produced in several ways. Silver is usually deposited from a reducing solution of a silver salt, such as an ammoniacal solution of silver nitrate containing dextrose or other reducing sugar. The silvering of glass surfaces is often carried out by first "sensitizing" the glass with an aqueous tin salt solution. Copper films can be deposited electrolytically, galvanically or chemically. A preferred method for use on glass, ceramic, and similar siliceous surfaces is deposition by contacting a previously silvered surface with an aqueous alkaline solution containing a copper salt, a reducing agent, a tartrate salt, and a nickel or cobalt salt. Such a method is described in copending application Ser. No. 285,356, filed June 4, 1963. Other methods include the use of copper gluconate solution in contact with a "super-sensitized" surface, such a method being described in United States Patent No. 3,093,509.

As indicated, the thickness of the film is dependent upon the intended use; thicker opaque films being used for mirrors and the like, and very thin transparent films being employed as decorative and solar shielding layers on windows and similar articles. In general, however, the articles to which the present invention pertains have a metallic layer of up to about 10 microinches in thickness.

When an additional organic coating is applied over the metallic film, it can be any organic film-forming coating composition. Preferred are coating compositions based on an alkyd resin, a urethane oil, or a vinyl halide polymer or copolymer, but others can also be employed, such as oleoresinous varnishes, nitrocellulose compositions, phenol-formaldehyde resin varnishes, and the like. These are applied in ordinary coating weights, for example, so as to provide a dried film thickness of 0.2 to 3 mils.

The substituted azoles which are used to protect the metallic film in accordance with the present invention include the aminotriazoles, the aminotetrazoles, and the aminoindazoles, i.e., triazoles, tetrazoles and indazoles substituted with at least one amino group, and indazole itself. Examples of such compounds include the following:

1-aminotetrazole
2-aminotetrazole
5-aminotetrazole
1,5-diaminotetrazole
2,5-diaminotetrazole
1-amino-1,2,4-triazole
3-amino-1,2,4-triazole
4-amino-1,2,4-triazole
4-amino-3,5-dimethyl-1,2,4-triazole
5-amino-1,2,3-triazole
5-amino-1,4-diphenyl-1,2,3-triazole
5-amino-4-methyl-2-phenyl-1,2,3-triazole
4,5-diamino-2-phenyl-1,2,3-triazole
Indazole
7-aminoindazole
5-aminoindazole The preferred compounds, both from the standpoint of availability and effectiveness, are 5-aminotetrazole and 3-amino-1,2,4-triazole. Where it is necessary to provide resistance to attack by chlorides and sulfides, as in mirrors, indazole and aminoindazoles in general are somewhat less effective than the aminotetrazoles and aminotriazoles.

The treatment with the azole can be carried out in several ways. A preferred method is to contact with metallic film with a dilute aqueous or alcohol solution of the azole as by immersion or by flowing the solution over the film. Solutions of varying concentration, e.g., 0.01 percent to 25 percent by weight of the azole, can be employed; in most instances, the solution contains from 0.05 percent to 5 percent by weight of the azole. Dusting with the dry azole can also be used, as can incorporation of the azole into the metallic film.

The time of treatment is not critical, some protective effect being imparted by even momentary contact, but in general, at least 10 seconds and preferably about 30 to 90 seconds are employed. Treatments longer than about 5 minutes can be used, but provide no apparent advantage. After treatment, the film is usually rinsed and dried; although rinsing can be omitted, it is desirable, especially when an organic coating is to be applied over the treated metal film.

Several alternative methods of treatment can be used when an organic coating is to be applied. In addition to treatment of the metallic film prior to application of the organic layer, the treatment with the azole or a solution of the azole can be carried out on the dried organic coating instead of on the metallic film. Just as the organic layer appears to be sufficiently permeable or porous to permit attack of the metallic film, it also permits the azole to effectively protect the metallic film when applied in this manner. Another manner of treating the metallic film is by mixing the substituted azole with the organic film-forming coating composition prior to application of the organic coating. The azole is then included in the organic layer.

The invention will be described further in connection with the following examples; these examples, being illustrative, should not be construed as limiting the invention to their details. All parts and percentages stated are by weight unless otherwise specified.

Example 1

A 9 inches x 12 inches panel of soda-lime-silica window glass (⅛ inch thick) was cleaned with a water slurry of cerium oxide and a felt block, and rinsed thoroughly with clear water. The glass surface was then contacted with a 1 percent aqueous stannous chloride solution and washed with water. This surface was then silvered by spraying it for 2.5 minutes with an aqueous ammoniacal silver nitrate solution containing 0.25 percent by weight of silver nitrate and 1 percent by weight of dextrose sugar. The silvered surface was washed with clear water, leaving a silver film about 4 to 5 microinches thick. The silver surface was treated by spraying with a 5 percent solution of 5-aminotetrazole in methanol, allowed to dry, rinsed with acetone, and again allowed to dry. The glass panel having the treated silver surface was then subjected to a standard salt-spray test for corrosion on mirrors (DDM–411, Test Method 151) along with a similar but untreated silvered panel. After 1 hour, the untreated silver film was completely corroded and washed away, while the treated panel retained 75 percent of its reflective surface.

Example 2

A glass panel was cleaned and silvered as in Example 1, and then the silver surface was coated with a copper layer by spraying with a solution of 40 grams of cupric sulfate and 2 milliliters of concentrated sulfuric acid per liter of distilled water, intermixed with a slurry of 3 grams of zinc dust per liter of distilled water. After about 40 to 50 milligrams per square foot of copper had been deposited (about 20 seconds), the surface was rinsed with water and then acetone, and dried. The copper surface was treated with 5-aminotetrazole and tested in the manner described in Example 1. After 16 hours in salt-spray, the untreated panel was completely corroded, while the treated panel retained over 50 percent of its reflective surface.

Example 3

A glass panel was silvered and the silver surface treated with 5-aminotetrazole, as in Example 1. The treated silver surface was then coated with a copolymer of 86 percent of vinyl chloride, 13 percent of vinyl acetate and 1 percent of maleic anhydride ("Vinylite VMCH"), which was applied by spraying a 20 percent solution in methyl ethyl ketone and air drying, to a 1 mil dry film thickness. The mirror panel thus produced and a similar but untreated panel were tested as in Example 1. After 24 hours, the treated panel retained over 25 percent more of its reflective surface than did the untreated panel.

Example 4

A glass panel having a treated copper surface, produced as in Example 2, was coated with a vinyl resin coating as described in Example 3. Upon testing as in the previous examples, the treated panel after 48 hours retained 25 percent more of its reflective surface than did an untreated panel.

Example 5

A glass panel was silvered as in Example 1, and then the untreated silver surface was coated with a vinyl resin coating as described in Example 3. One-half of the coated surface was then dusted with 5 grams per square foot of powdered 5-aminotetrazole, the other half remaining untreated. This panel was then tested as before. It was found that after 24 hours all of the metal film on the untreated portion of the panel had corroded away, whereas the treated half retained 80 percent of its reflective surface.

Example 6

A urethane oil solution (50 percent nonvolatile resin solids in xylene) of the following composition was employed in this example:

| | Percent by weight |
|---|---|
| Linseed oil | 53.2 |
| Dehydrated castor oil | 6.0 |
| Glycerine | 8.0 |
| Styrene-allyl alcohol copolymer (Shell X–450) | 10.0 |
| Tolylene diisocyanate | 22.8 |

To the above urethane oil solution there was added sufficient of a 2 to 1 butanol-ethanol mixture to reduce the resin solids content to 25 percent. Also added was 0.1 percent, based on resin solids, of 5-aminotetrazole, this being dissolved in the alcohol mixture. The composition thus prepared was sprayed onto the silver surface of a glass panel silvered as in Example 1, to give a dry film thickness of 1 mil, and the coated panel was heated to a glass temperature of 200° F. over a 3-minute period. Testing of the treated panel thus prepared was carried out as before. Shown below are the percentages of reflective surface retained after several periods in salt-spray, along with the corresponding values for a panel silvered and coated with the same composition, but omitting the 5-aminotetrazole.

| | 48 hours | 120 hours |
|---|---|---|
| With 5-aminotetrazole | 100 | 95 |
| Without 5-aminotetrazole | 10 | 0 |

Example 7

Example 6 was repeated, except that the panels had a copper film produced as in Example 2.

| | 120 hours | 300 hours |
|---|---|---|
| With 5-aminotetrazole | 95+ | 80 |
| Without 5-aminotetrazole | 50 | 0 |

Example 8

Examples 6 and 7 were repeated, except that the silver film and the copper film were each treated with 5-aminotetrazole, as in Examples 1 and 2; the organic coatings also contained 5-aminotetrazole, as in Examples 6 and 7. After 300 hours in salt-spray, the silvered panel retained 65 percent of its reflective surface, and the silvered and coppered panel retained 90 percent.

Example 9

Examples 6 and 7 were repeated, using 3-amino-1,2,4-triazole in place of 5-aminotetrazole. After 120 hours in salt-spray, the percentages of reflective surface retained were as follows:

| | Silver | Copper |
|---|---|---|
| With 3-amino-1,2,4-triazole | 98 | 100 |
| Without 3-amino-1,2,4-triazole | 0 | 50 |

Substitution of 3-amino-1,2,4-triazole for 5-aminotetrazole in any of the other examples above also provides equivalent or even better results.

Example 10

Examples 6 and 7 were repeated, using 7-amino-indazole in place of 5-aminotetrazole. The results after 48 hours in salt spray were as follows:

| | Silver | Copper |
|---|---|---|
| With 7-aminoindazole | 100 | 95+ |
| Without 7-aminoindazole | 10 | 85 |

Example 11

Examples 6 and 7 were repeated, using indazole in place of 5-aminotetrazole. The results after 120 hours in salt-spray were as follows:

| | Silver | Copper |
|---|---|---|
| With indazole | 40 | 80 |
| Without indazole | 0 | 50 |

As is indicated by the foregoing examples, aminotriazoles, aminotetrazoles, and to a lesser extent, indazole and aminoindazoles, are extremely effective in preventing corrosive attack of thin films of copper or silver. Other related compounds which have been employed as corrosion inhibitors in other applications are not sufficiently effective in such films. For example, benzotriazole was substituted for 5-aminotetrazole in panels prepared and tested as described in Example 7. The percentages of reflective surface retained were as follows (the values for 5-aminotetrazole being given for comparison):

| | 120 hours | 216 hours |
|---|---|---|
| Benzotriazole | 35 | 0 |
| 5-aminotetrazole | 95 | 90 |
| Untreated | 50 | 0 |

It is to be noted that the benzotriazole-treated panel corroded more rapidly than the untreated panel. Other compounds which might be expected to be effective are also not useful herein, in many cases apparently accelerating the corrosion of thin copper and silver films. For example, panels with copper and silver films treated with 2-aminothiazole and 2-imidazolidine thione (ethylene thiourea) and tested as above each corroded more rapidly than a control (untreated) panel.

It thus appears that the substituted azoles have a unique effect on thin films of copper and silver. Similar results to those illustrated are attained with the other substituted azoles of the class described, such as those specifically mentioned above.

The best over-all durability in mirrors is attained by coating the metallic film with an organic coating, and for this purpose various coating compositions, either pigmented or unpigmented, can be employed, using conventional pigments for the particular vehicle utilized where desired. In addition to the urethane oils and vinyl halide resins exemplified above, particularly useful film-forming materials for such coatings include the alkyd resins and especially alkyds modified by the inclusion of a monomer, such as styrene, or a phenol-formaldehyde resin. An example of an alkyd resin useful for coatings as described herein (e.g., in Example 6 above) has the following composition:

| | Percent by weight |
|---|---|
| Soya oil | 26.0 |
| Dehydrated castor oil | 13.0 |
| Styrene | 10.0 |
| Methyl methacrylate | 10.0 |
| Phthalic anhydride | 28.9 |
| Glycerine | 12.1 |

Other alkyds, modified or unmodified, can also be employed.

When a protective organic layer is employed over a silver surface, there is a tendency for the silver surface to discolor over a period of time. This discoloration is not the usual type of corrosive attack, which takes a longer period in normal usage, but is likely due to the presence of reactive groups in the organic layer. The compounds herein are also effective in preventing such discoloration, as illustrated by the following example:

EXAMPLE 12

Following the procedure of Example 6 above, a series of panels were prepared, each having one of the following additive compounds:

(a) 5-aminotetrazole
(b) 3-amino-1,2,4-triazole
(c) Benzotriazole
(d) None

These panels were then hung on an interior wall in a room maintained at normal temperatures (70° F. to 80° F.). After one year, the panels had the following appearance:

| Additive: | Appearance |
|---|---|
| 5-aminotetrazole | Clear, no visible change. |
| 3-amino-1,2,4-triazole | Clear, no visible change. |
| Benzotriazole | Completely copper in color. |
| None | Completely metallic yellow in color. |

The invention is illustrated above in connection with metal films as used on articles such as mirrors. The invention is also especially useful to improve the durability and weatherability of transparent films of silver and copper as used on windows and the like; such windows and other transparent articles may have a luminous transmittance of 5 percent or even less. Thin metal films are employed in such articles to reduce the transmission of heat and ultraviolet light through glass, one such application being in multiple glazed insulating window units. The azole compounds herein described inhibit deterioration and corrosion of these films due to contaminants, as well as from the action of heat, oxygen and irradiation. Several examples of this embodiment of the invention are as follows:

EXAMPLE 13

Several glass panels of polished plate glass (soda-lime-silica glass) 4 inches by 8 inches by ⅛ inch thick were coated with a transparent metallic film. In each case, the glass surface to be filmed was cleaned and then contacted with a solution of 0.1 percent by weight of stannous chloride in demineralized water, applied by pouring 3 to 4 fluid ounces per square foot onto the glass surface to be filmed, and allowing the solution to stand for about 2 minutes. The glass surface was rinsed with demineralized water. The wet glass surface was then contacted with an aqueous solution of ammoniacal silver nitrate which contained 5 parts of silver nitrate, 15 volume parts of 28 percent aqueous ammonium hydroxide and 10 parts of dextrose sugar and sufficient demineralized water to make 1000 volume parts. This solution was sprayed on the glass surface for a period of 3 minutes to deposit a transparent metallic silver film ranging from 4 to $20 \times 10^{-8}$ inches in thickness. The spray was applied at about 80° F. The excess silver solution was then rinsed off the surface of the glass with demineralized water and the wet surface was contacted with a copper film-forming solution made from two intermediate solutions. One solution contained 34.6 parts by weight of cupric sulfate, 8.6 parts by weight of nickel sulfate, 275 volume parts of a 37 percent by weight aqueous formaldehyde solution and 1000 volume parts of demineralized water. The other solution contained 175 parts by weight of sodium-potassium tartrate, 50 parts by weight of sodium hydroxide and sufficient demineralized water to produce a total volume of 1000 volume parts. The copper film-forming solution was made by mixing these solutions along with 4 additional parts of demineralized water. This final solution was then applied to the silvered surface for 2 to 3 minutes to deposit a thin transparent metallic copper film about $0.75 \times 10^{-6}$ inches thick and containing 20 to 25 milligrams of copper per square foot. The copper film was then rinsed with demineralized water to remove excess copper solution and then dried in air.

One half of the copper filmed glass surface of each panel was then contacted with 3 to 4 fluid ounces per square foot of an aqueous solution of 0.1 percent by weight of one of the following:

(a) 3-amino-1,2,4-triazole
(b) 5-aminotetrazole
(c) 7-aminoindazole
(d) Indazole The dilute aqueous solution in each case was poured on the filmed surface of the glass and allowed to stand for 3 minutes, and then rinsed with demineralized water and dried in air. The panels were then placed in an air convection oven at 160° F. until the films oxidized. Oxidation was evidenced by a color change in the film from copper color to blue or purple, accompanied by a considerable increase in luminous transmittance. It was found that the treated portion of the panels resisted oxidation for 6 to 15 days, compared to 2 to 3 days for the untreated areas. Based on the average results of several panels with each material, the 3-amino-1,2,4-triazole and 5-aminotetrazole were slightly more effective than the others.

EXAMPLE 14

Polished clear glass plates 12 inches by 12 inches by 0.25 inch thick were cleaned and coated as described in Example 13. The plates were then treated with a solution of 3-amino-1,2,4-triazole as in Example 13. Several double glazed insulating glass window units were made, each with one of the treated plates and a similar uncoated and untreated plate. These were produced by hermetically sealing the plates at their edges with a tacky mastic in a common metal frame with a ½ inch air space between them, the treated surface being glazed inwardly. Such units are more fully described in United States Patent No. 2,838,810. These were then tested by heating in an air convection oven at 180° F. and by the conventional Atlas Color Fade-Ometer test, in which the unit is continuously revolved around two carbon arc lamps which generate ultraviolet energy. The deterioration is evidenced by an increase in the total solar energy transmission (TSE) from the original 22 percent, as measured with an Eppley Pyroheliometer. Set forth below are the changes in transmission over varying times, the figures given being the average of 16 samples, along with the corresponding results obtained with similar double glazed units having a copper-filmed plate, but not treated with an azole.

HEAT TEST

| Time of Exposure | Increase in Percent TSE | |
| --- | --- | --- |
| | Treated | Untreated |
| 10 days | 2.4 | 14.6 |
| 24 days | 3.0 | 17.7 |
| 58 days | 4.3 | 21.0 |
| 79 days | 5.4 | 21.0 |
| 100 days | 5.6 | 21.0 |
| 128 days | 5.5 | 21.0 |

FADE-OMETER TEST

| Time of Exposure | Increase in Percent TSE | |
| --- | --- | --- |
| | Treated | Untreated |
| 184 hours | 2.6 | 12.1 |
| 420 hours | 3.6 | 17.3 |
| 969 hours | 5.5 | 20.0 |
| 1,294 hours | 8.2 | 20.2 |
| 1,640 hours | 8.9 | 20.9 |
| 2,077 hours | 9.7 | 21.0 |
| 2,766 hours | 10.8 | 21.0 |

The deterioration was also evidenced by a change in the copper color to a blue-green color. Analysis of the deteriorated film showed it to be copper oxide.

The effectiveness of the above compounds in preventing degradation of transparent silver and copper films was confirmed by other accelerated tests and by exposure under field conditions.

While the invention has been described in connection with thin copper and silver films applied to glass surfaces, these providing the preferred embodiments of the invention, the treatment described herein is not limited to such articles. For example, it can be used with metallic films on various other substrates, such as wood, plastics, metals, and the like.

According to the provisions of the patent statutes, there are described above the invention and what are now considered to be its best embodiments. However, within the scope of the appended claims, it is to be understood that the invention can be practiced otherwise than as specifically described.

What is claimed is:

1. An article comprising a thin film of a metal selected from the group consisting of silver and copper, said film having been contacted with a compound selected from the group consisting of aminotriazoles, aminotetrazoles, aminoindazoles and indazole.

2. The article of claim 1 in which said compound is 5-aminotetrazole.

3. The article of claim 1 in which said compound is 3-amino-1,2,4-triazole.

4. The article of claim 1 in which said film is attached to a glass surface.

5. An article comprising a glass surface having thereon an adherent plural coating which comprises at least one layer of a metal selected from the group consisting of silver and copper, and a superimposed layer of an organic film-forming coating composition compatible with said metal, at least one of the layers of said plural coating having been contacted with a compound selected from the group consisting of aminotriazoles, aminotetrazoles, aminoindazoles and indazole.

6. The article of claim 5 in which said coating composition comprises a urethane oil.

7. The article of claim 5 in which said coating composition comprises an alkyd resin.

8. The article of claim 5 in which said coating composition comprises a vinyl halide resin.

9. A mirror comprising a glass surface having thereon an adherent metallic coating comprising at least one metal selected from the group consisting of silver and copper, the outer surface of said metallic coating having been contacted with a compound selected from the group consisting of aminotriazoles, aminotetrazoles, aminoindazoles and indazole.

10. A mirror comprising a silvered glass surface having thereon an adherent thin copper layer, said copper layer having been contacted with a compound selected from the group consisting of aminotriazoles, aminotetrazoles, aminoindazoles and indazole.

11. A mirror comprising a silvered glass surface having thereon a plural coating comprising a thin copper layer and a superimposed layer of an organic film-forming coating composition compatible with said metal, at least one of the layers of said plural coating having been contacted with a compound selected from the group consisting of aminotriazoles, aminotetrazoles, aminoindazoles and indazole.

12. The mirror of claim 11 in which the copper layer is contacted with said compound prior to the application of said superimposed layer.

13. The mirror of claim 11 in which said superimposed layer is contacted with said compound.

14. The mirror of claim 11 in which said compound is in admixture with said organic film-forming coating composition.

15. A transparent glass article comprising a glass member having thereon a thin transparent coating comprising at least one metal selected from the group consisting of silver and copper, said coating having been contacted with a compound selected from the group consisting of aminotriazoles, aminotetrazoles, aminoindazoles and indazole.

16. The article of claim 15 in which said coating comprises a silver layer and a superimposed copper layer, the outer surface of said copper layer having been contacted with said compound.

17. A multiple glazed unit comprising a plurality of glass sheets hermetically sealed at their edges to form an enclosed air space, at least one of said glass sheets having its inner surface coated with an adherent transparent coating comprising a silver layer and a superimposed copper layer, said coating having been contacted with a compound selected from the group consisting of aminotriazoles, aminotetrazoles, aminoindazoles and indazole.

18. A method of treating an article comprising a thin film which comprises at least one metal selected from the group consisting of silver and copper, said method comprising contacting said film with a solution of a compound selected from the group consisting of aminotriazoles, aminotetrazoles, aminoindazoles and indazole, said solution containing from about 0.05 percent to about 5 percent by weight of said compound.

19. In a method of producing an article comprising a glass surface having thereon a plural coating in which there is applied to said glass surface at least one layer of a metal selected from the group consisting of silver and copper, and a superimposed layer of an organic film-forming coating composition, the improvement which comprises contacting at least one of said layers with a compound selected from the group consisting of aminotriazoles, aminotetrazoles, aminoindazoles and indazole.

20. The improvement of claim 19 in which the layer of said metal is contacted with a solution of said compound prior to the application of said coating composition.

21. The improvement of claim 19 in which the superimposed layer of said coating composition is contacted with a solution of said compound.

22. The improvement of claim 19 in which said compound is applied in admixture with said coating composition.

References Cited

UNITED STATES PATENTS

| | | | |
|---|---|---|---|
| 2,856,818 | 10/1958 | Woodberry | 117—135 |
| 2,941,953 | 6/1960 | Hatch | 252—390 |
| 3,161,531 | 12/1964 | Dettre et al. | 117—124 |

FOREIGN PATENTS 580,356   7/1959   Canada.

ALFRED L. LEAVITT, *Primary Examiner.*

H. COHEN, *Assistant Examiner.*